(12) United States Patent
Hucker et al.

(10) Patent No.: US 9,552,905 B2
(45) Date of Patent: Jan. 24, 2017

(54) STRUCTURAL INTEGRATED WIRING LOOM

(71) Applicant: BAE Systems Plc, London (GB)

(72) Inventors: Martyn John Hucker, Bristol (GB); David William Gough, Bristol (GB); Michael Dunleavy, Bristol (GB); Sajad Haq, Bristol (GB)

(73) Assignee: BAE Systems plc, London (GB)

( * ) Notice: Subject to any disclaimer, the term of this patent is extended or adjusted under 35 U.S.C. 154(b) by 246 days.

(21) Appl. No.: 14/408,751

(22) PCT Filed: Jun. 7, 2013

(86) PCT No.: PCT/GB2013/051500
§ 371 (c)(1),
(2) Date: Dec. 17, 2014

(87) PCT Pub. No.: WO2013/190267
PCT Pub. Date: Dec. 27, 2013

(65) Prior Publication Data
US 2015/0162114 A1 Jun. 11, 2015

(30) Foreign Application Priority Data
Jun. 18, 2012 (GB) .................................. 1210733.0

(51) Int. Cl.
*H02G 3/00* (2006.01)
*B32B 5/26* (2006.01)
(Continued)

(52) U.S. Cl.
CPC ................. *H01B 9/006* (2013.01); *B32B 5/26* (2013.01); *B60R 16/023* (2013.01);
(Continued)

(58) Field of Classification Search
CPC ........... H01B 9/003; H01B 9/006; B32B 5/26; B32B 2250/20; B32B 2260/046; B32B 2262/0253; B32B 2262/0261; B32B 2262/0269; B32B 2262/0276; B32B 2262/062; B32B 2262/101; B32B 2262/106; B32B 2307/202; B32B 2307/204; B32B 2307/206; B32B 2605/00; B60R 16/0207; B60R 16/023; B60R 16/03; H01G 11/22; H01R 43/24; Y10T 29/49171; Y02E 60/13; Y02T 10/7022
(Continued)

(56) References Cited

U.S. PATENT DOCUMENTS 5,089,326 A 2/1992 Bonazza
2012/0111614 A1 5/2012 Free

FOREIGN PATENT DOCUMENTS

DE 10100814 A1 7/2001
DE 102007029525 A1 10/2008
(Continued)

OTHER PUBLICATIONS

PCT Search Report dated Aug. 13, 2013 of Patent Application No. PCT/GB2013/051500 filed Jun. 7, 2013, 2 pages.
(Continued)

*Primary Examiner* — Hal Kaplan
(74) *Attorney, Agent, or Firm* — Maine Cernota & Rardin

(57) ABSTRACT

According to the invention there is provided a Structural integrated wiring loom comprising at least one conductor comprising at least one first conductive fiber ply, wherein said at least one first conductive fiber ply comprises at least two electrical connectors, a separator structure comprising at least one first non-conductive fiber ply, and at least one second non-conductive fiber ply, said separator structure
(Continued)

encapsulating said at least one conductor, a screen structure which encapsulates said separator structure, said screen structure comprising at least one second conductive fiber ply and at least one third conductive fiber ply, wherein said device is encapsulated a binder matrix. The device may be used to replace structural panels on a vehicle vessel or craft, to transfer electrical power or RF signals, data transmission around a composite structure.

10 Claims, 2 Drawing Sheets

(51) Int. Cl.
*H01B 9/00* (2006.01)
*H01G 11/22* (2013.01)
*B60R 16/02* (2006.01)
*B60R 16/023* (2006.01)
*B60R 16/03* (2006.01)
*H01R 43/24* (2006.01)

(52) U.S. Cl.
CPC .......... *B60R 16/0207* (2013.01); *B60R 16/03* (2013.01); *H01B 9/003* (2013.01); *H01G 11/22* (2013.01); *H01R 43/24* (2013.01); *B32B 2250/20* (2013.01); *B32B 2260/046* (2013.01); *B32B 2262/0253* (2013.01); *B32B 2262/0261* (2013.01); *B32B 2262/0269* (2013.01); *B32B 2262/0276* (2013.01); *B32B 2262/062* (2013.01); *B32B 2262/101* (2013.01); *B32B 2262/106* (2013.01); *B32B 2307/202* (2013.01); *B32B 2307/204* (2013.01); *B32B 2307/206* (2013.01); *B32B 2605/00* (2013.01); *Y02E 60/13* (2013.01); *Y02T 10/7022* (2013.01); *Y10T 29/49171* (2015.01)

(58) Field of Classification Search
USPC .......................................................... 307/9.1
See application file for complete search history.

(56) References Cited

FOREIGN PATENT DOCUMENTS

| WO | 03033573 A1 | 4/2003 |
| WO | 03033573 A1 | 4/2004 |
| WO | 2006130454 A2 | 12/2006 |

OTHER PUBLICATIONS

GB Search Report dated Oct. 2, 2012 of Patent Application No. GB1210733.0 filed Jun. 18, 2012, 3 pages.
International Preliminary Report on Patentability and Written Opinion of the International Searching Authority of PCT Application No. PCT/GB2013/051500, dated Dec. 23, 2014, 8 pages.
Database WPI, Week 198110, Thompson Scientific, London, GB; AN 1981-16225D XP002708176.

STRUCTURAL INTEGRATED WIRING LOOM

RELATED APPLICATIONS

This application is a US National Phase Application filed under 35 USC 371 of PCT Application No. PCT/GB2013/051500, filed 7 Jun. 2013, which claims the benefit of GB Application No. 1210733.0, filed 18 Jun. 2012. Each of these applications is herein incorporated by reference in their entirety for all purposes.

The invention relates to a structural integrated wiring loom in a composite fibre reinforced polymer material.

Electrical power and electronic signals are typically carried via a wiring loom assembled from groups of insulated cables which are built into a system during assembly. Wiring looms can occupy significant internal volumes and add mass to a system. Limited accessibility can lead to difficulties in making repairs or upgrades and if spare capacity is added this may incur further weight and volume penalties.

According to a first aspect of the invention there is provided a structural composite integrated wiring loom device comprising
 at least one conductor comprising at least one first conductive fibre ply, wherein said at least one first conductive fibre ply comprises at least two electrical connectors,
 a separator structure comprising at least one first non-conductive fibre ply, and at least one second non-conductive fibre ply, said separator structure encapsulating said at least one conductor,
 optionally a screen structure which encapsulates said separator structure, said screen structure comprising at least one second conductive fibre ply and at least one third conductive fibre ply,
 wherein said device is encapsulated a binder matrix; preferably the screen structure is present to provide electrical shielding and further rigidity to the final cured device.

The integral wiring loom provides a low volume wiring system for providing signals transmission and electrical power transfer between the first and second electrical connectors.

The electrical connectors and the at least one conductor are capable of carrying any typical signal or physical transfer of electrons typically associated with conductors, such as for example RF signals and electric currents. The RF signals typically those used in communications and data transfer using known data transmission means.

Typical wiring looms are bundles of copper wire, which are bulky and add mass to the system that they are fitted within. Clearly there is a drive towards reduced mass structures, typically those that employ fibre reinforced polymer composite materials. Further, as devices become more compact, and the need for data transfer and electrical power transfer increases, the volumes into which wiring looms can be incorporated are reduced. The present invention provides a means for providing the electrical power and/or transmission of data via the structural body of the system in question, rather than via a separate wiring loom.

The at least one conductor may be selected from any electrically conductive plys, such as, for example carbon fibre plys, metal coated non-conductive plys, metal woven plys. In a highly preferred arrangement the carbon fibre plys, may be coated or impregnated with a conductive material such as, for example metal, carbon nanotubes, most preferably the at least one conductor is coated with a layer of metal. The metal coating may be selected from any metal, preferably nickel, copper, silver and gold.

The at least one conductor is preferably one ply of woven fabric thick, such that the final device is kept as thin as possible. The at least one conductor may take up the full width of the device, however it is preferable that there are a plurality of conductors in any device, therefore the width is preferably less than 50 mm, more preferably less than 20 mm. Whilst the conductor could be a single strand of fibre from the woven fabric ply, it would be prone to resistive heating under high current loads.

The separator structure may be any electrically non-conducting fibre ply, i.e. an electrical insulator, to prevent electrical contact between the at least one conductor and the screen structure. The separator structure may comprise a non-conducting fibre ply with a further layer or coating of an electrical insulator material. The electrically non-conducting fibres may be glass, polymer, ceramic or textile fibres, and may be selected depending on the desired mechanical or physical properties of the wiring loom. Examples of suitable electrically insulating fibres include E-glass fabric, and silicon carbide fibres. Examples of textile fibres include natural fibres such as cotton, and synthetic fibres which are typically polymer fibres such as aram ids, UHMWPE, Nylon® and polyester.

The separator layer, which separates adjacent at least one conductors may be formed from the same material as the separator structure.

The screen structure may be any conductive fibre ply, and may be selected as the same material as the at least one conductor. In a highly preferred arrangement the screen structure is selected from carbon fibre. The resistance value of the screen structure, does not need to be as low as the resistance value of the at least one conductor, where it is desirable to keep resistance values low to reduce resistive heating and reduce power requirements for data transmission. The screen structure additionally provides a significant degree of the strength of the final cured fibre reinforced polymer composite structure.

The transfer of signals via the at least one conductor may require screening from interference, the at least two electrical connectors all share the same screen structure. This removes the requirement for providing individual screening for each of the plurality of at least one conductors.

The encapsulation of the various layers ensures that there are no electrical short circuits, between the at least one conductor and the screen structure. Therefore the size of the plys that are encapsulating an interior structure or layer may be selected to be exactly the same area size or larger.

The binder matrix may be selected from any commonly used resin system for fibre reinforced polymer composite manufacture, such as, for example, an epoxy resin.

The electrical connectors may be selected from resistive, capacitive or inductive electrical connectors, Preferably the electrical connectors are resistive, such as for example those which are based on electro-mechanical connectors, which permit facile mechanical or physical fastening of electrical components such as electronic circuits, wires, lighting, video, wifi/lan, etc. preferably the electromechanical connectors provide reversible connectivity.

The devices of the invention may comprise a plurality of electrical connectors located along the length of the conductor to provide electrical power, transmit data or couple together multiple devices according to the invention. It may be desirable to transfer electrical power and or signals from distal ends of a vehicle. The vehicle may have several structural panels, which may need to be linked via such electrical connectors. A conventional wiring loom may become compromised if subjected to a trauma, in which case the entire loom may need to be replaced, a structural wiring loom according to the invention may provide a quick replacement for a single compromised section, leaving all other structural panels in place.

The electrical connector may be a permanent joint using solder or a conductive adhesive to form the joint to electrically connect the wiring loom to the electrical, electronic or power source components.

The electrical conductors are embedded in and form an integral part of the wiring loom, the surround FRPC provides protection to the electrical conductors. Further it prevents the electrical conductors from movement or abrasion from rubbing against portions of body work or vibration, which often cause traditional wires in a wiring loom to break.

Preferably there is a plurality of at least one conductors within the separator structure, each conductor comprising at least two electrical connectors which are electrically isolated from each other. The conductors may provide data transmission and or electrical power transfer, and so it may be desirable to allocate further conductors for data transmission and/or electrical power transfer.

In a preferred arrangement where there are a plurality of conductors located in close proximity, adjacent pairs may be separated by a separator layer to prevent an electrical short.

According to a further aspect of the invention there is provided a structural composite integrated wiring loom device comprising
- at least one first conductive fibre ply, at least one second conductive fibre ply,
- a separator layer, comprising at least one non-conductive fibre ply, which separates the first and second conductor fibre plys respectively,
- a separator structure which encapsulates the at least one first conductive fibre ply, at least one second conductive fibre ply and a separator layer,
- a screen structure which encapsulates said separator structure, said screen structure comprising at least one second conductive fibre ply and at least one third conductive fibre ply,
- wherein said device is encapsulated a binder matrix; wherein said first conductive fibre ply comprises at a first least two electrical connectors, and said second conductive fibre ply comprises a second at least two electrical connectors, wherein the first and second at least two electrical connectors are electrically isolated from each other.

In a preferred arrangement the separator structure lies along a first planner axis and both the at least one first conductive fibre ply, and at least one second conductive fibre ply, are both substantially parallel and co-planner with said separator structure. In such an arrangement the plurality of at least one first conductive fibre ply and at least one second conductive fibre ply, are in a co-planner arrangement.

There is an increased use of sensors on vehicles vessels and crafts, the data from such sensors may need to be relayed from distal ends of the vehicle, conveniently transferred via integral wiring looms according to the invention.

According to a further aspect of the invention there is provided a method of manufacturing a wiring loom device as defined herein, including the steps of providing at least two electrical connectors on at least one conductor, encapsulating the at least one conductor in a separator structure, comprising at least one first and one second non-conductive fibre ply, encapsulating said separator structure in a screen structure, said screen structure comprising at least one second and one third conductive fibre ply. Preferably at least one of the second or third conducting plys is in electrical contact with the screening contact terminal of an electrical connector.

The device may conveniently allow connection between components and a structural composite electrical energy storage device, such as for example a composite battery, composite thermoelectric device or a composite supercapacitor.

The thickness of the structures and/or the separator structure may be conveniently varied in order to provide desired mechanical and electrical properties. These structures may be formed from one or more layers. Variation of the number of layers is one way in which the thickness of these structures may be varied.

According to a further aspect of the invention there is provided a panel on a vehicle vessel or craft comprising at least one device according to the invention.

A structural wiring loom device is one which can be used in place of an existing panel or element, which forms part of a body, such as a replacement panel on a vehicle vessel or craft. The devices as defined herein provide both structural support (in the same fashion as the vehicles original manufactures panel) and provide a low volume and low mass means of transferring RF signals or electrical power around said vehicle vessel or craft.

A particular application of structural integral wiring loom device is seen as providing both structure and transfer of electrical power and RF signals in electrically powered vehicles, vessels or crafts. The wiring looms used in this way will work well with solar cells, positioned say on the aircraft wings, which can be used to re-charge the cells, which may be located in a different part of the craft, in flight. Devices according to the invention, may be used for example as wing skins and can be used to transfer power to on board electrical systems.

Devices according to the invention may be used in new designs or to replace worn, damaged or outdated parts of any items which can be manufactured of a metallic material. For example, vehicles, whether land, air, space or water born, may have parts manufactured with power sources and use integral wiring looms to transfer the electrical energy to motors, circuits, sensors, structural monitoring equipment, control surfaces, cameras, lights etc at remotes points on the vehicle. Conveniently, where the device is used to replace a panel on an existing body, vehicle, vessel or craft, the device may preferably be engineered to the same dimensions as the original panel.

Further potential uses on vehicles may include body panels on hybrid or electric drive vehicles where the devices of the invention can be used to save weight and bulk, compared to conventional devices. Such devices may also find use on free flooding hydrodynamic hulls of, say, submersible remotely operated vehicles. The devices would be especially useful on any vehicle where weight or bulk was at a premium like an aircraft or a satellite. On a satellite the saving in space and bulk of devices according to the invention which could be used to transfer power or data to various systems and would likely increase the payload capability of the satellite substantially.

A further advantage of using structural integral wiring loom devices according to the invention is that the mass of the replacement panels, where desired, may be distributed integrally throughout the host structure. This can be very beneficial, for example, when sudden shocks occur. Such shocks might occur, for example, for vehicles involved in collisions. Under such conditions the integral nature of the devices will prevent their tending to act as uncontained missiles.

Of potential great importance would be the use of devices according to the invention in electrical or electronic equipment, in particular portable equipment such as computers, personal digital assistants (PDAs), cameras and telephones. Here mountings for such equipment such as circuit boards, casings and the like could be made according to the invention which would, again, assist in cutting down the weight and bulk of such items enabling them to be lighter, smaller and possibly cheaper, owing to the reduced part count. In addition, the perennial problem of heat dissipation in portable equipment powered by batteries/supercapacitors could be alleviated by incorporating the devices in, for example, the casing of a portable computer where they could dissipate heat much more easily with the possible avoidance of the need for cooling fans.

Whilst the invention has been described above, it extends to any inventive combination of the features set out above, or in the following description, drawings or claims.

Exemplary embodiments of the device in accordance with the invention will now be described with reference to the accompanying drawings in which.

Figure 1:
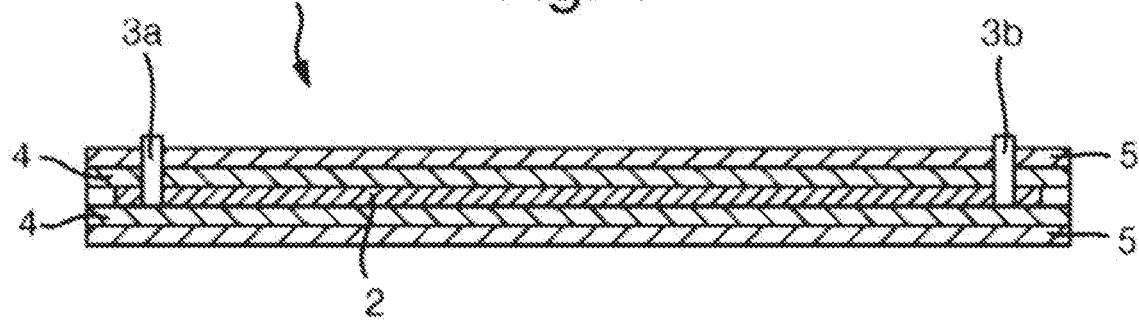
FIG. 1 shows a cross sectional side view of a composite wiring loom device.

Turning to FIG. 1 shows a composite wiring loom 1, which is formed from a conductor 2 typically a ply of coated carbon fibre. The conductor 2 is fitted with electrical connectors 3a and 3b at distal ends of the conductor 2. Two layers of separator structure 4, typically at least two plys of an E glass fibre material encapsulate the conductor 2; a small hole is formed in the separator structure 4 to allow the electrical connector 3a, 3b to be fed through. A screen layer 5, typically two plys of carbon fibre, encapsulate the separator structure 4; again with through holes for the electrical connectors 3a, 3b. The entire device is impregnated with a binder matrix to form a fibre reinforced polymer composite.

Figure 2:
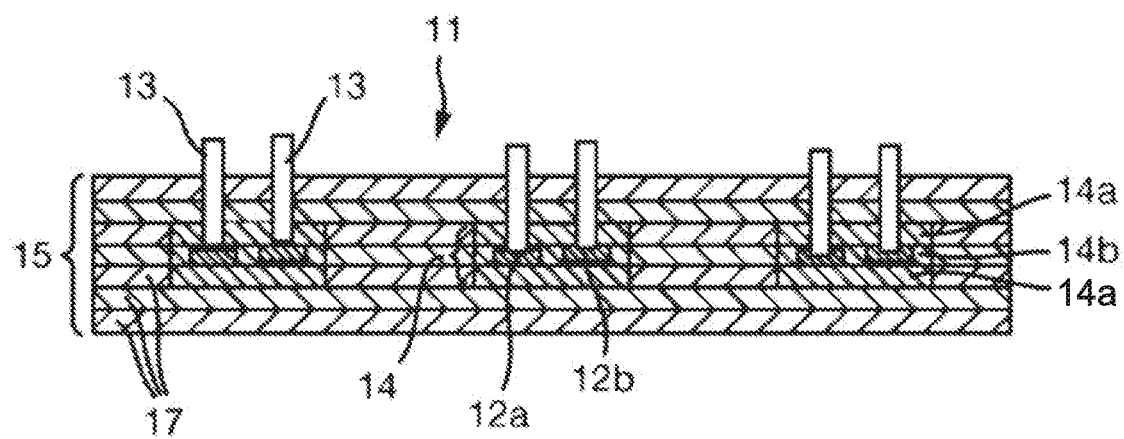
FIG. 2 shows an end of view of a composite wiring loom device.

FIG. 2 shows an end view of a composite wiring loom 11, which is formed from closely located pairs of conductors 12a 12b, single plys of nickel coated carbon fibre. The conductors 12a, 12b are fitted with electrical connectors generally shown 13 at distal ends of the conductors 12a, 12b. A separator layer 14a separates the two conductors 12a, 12b and a separator structure 14, formed from at least two plys of e-glass fibre 14b, encapsulate the conductors 12a, 12b and separator layer 14a. A screen layer 15, in this instance 7 plys of carbon fibre 17 encapsulate the separator structure 14. The entire device 11 is impregnated with a binder matrix to form a fibre reinforced polymer composite, using known curing methods.

Figure 3:
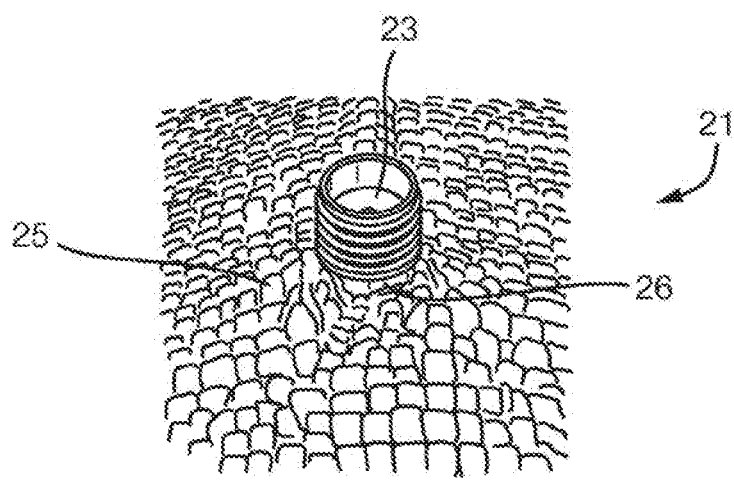
FIG. 3 shows a close up of an electrical connector embedded in a wiring loom.

FIG. 3 shows a female SMA type electrical connector 23, which has been embedded in the wiring loom 21. The screening layer 25 is affixed to the screening terminal 26 of the SMA connector 23. This allows the screening layer 25 to provide effective RF screening.

Figure 4:
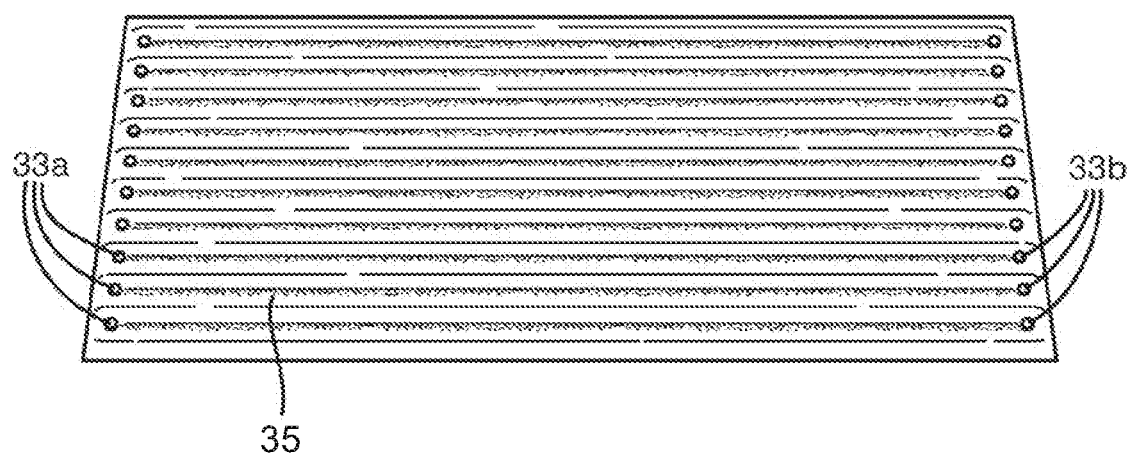
FIG. 4 shows a top view of a multi ported wiring loom

FIG. 4 shows a top view of a wiring loom 31, with a plurality of female SMA electrical connectors 33a and 33b located at substantially distil ends of the loom 31. All the connectors are linked at their respective screening terminals by the same electrical screen structure 35.

The at least one conductor, separator structure, separator layer, and screen structure are not necessarily planar. Non-planar configurations may be employed, for example, to provide a curved or even a generally tubular device structure, or to provide devices which can be shaped to any currently existing shaped panel. The structures of the invention are well suited for such configurations.

The device may be used to replace structural panels on a vehicle vessel or craft, to transfer electrical power or RF signals, data transmission around a composite structure.

The invention claimed is:

1. A structural cured fibre reinforced polymer composite integrated wiring loom device comprising:
    at least one conductor comprising at least one first conductive fibre ply, wherein said at least one first conductive fibre ply comprises at least two electrical connectors;
    a separator structure comprising at least one first non-conductive fibre ply, and at least one second non-conductive fibre ply, said separator structure encapsulating said at least one conductor; and
    a screen structure which encapsulates said separator structure, said screen structure comprising at least one second conductive fibre ply and at least one third conductive fibre ply;
    wherein said device comprises an impregnated cured binder matrix.

2. A device according to claim 1, wherein there are a plurality of at least one conductors within the separator structure, each conductor comprising at least two electrical connectors which are electrically isolated from each other.

3. A device according to claim 1, wherein the at least two electrical connectors all share the same screen structure.

4. A device according to claim 2 wherein there are a plurality of at least one conductors which are located in close proximity and adjacent pairs of at least one conductors are separated by a separator layer.

5. A device according to claim 1 wherein the at least one conductor is selected from carbon fibre plys.

6. A device according to claim 5 wherein the carbon fibre ply is coated with a layer of metal.

7. A device according to claim 1 wherein the conductor has a thickness of one fibre ply and a width of less than 50 mm.

8. A device according to claim 7 wherein the conductor has a width of less than 20 mm.

9. A method of manufacturing a device according to claim 1, further comprising:
    providing at least two electrical connectors on at least one conductor;
    encapsulating the at least one conductor in a separator structure, comprising at least one first and one second non-conductive fibre ply; and
    encapsulating said separator structure in a screen structure, said screen structure comprising at least one second and one third conductive fibre ply.

10. A structural panel on a vehicle vessel or craft comprising at least one structural cured fibre reinforced polymer composite integrated wiring loom device, said device including:
    at least one conductor comprising at least one first conductive fibre ply, wherein said at least one first conductive fibre ply comprises at least two electrical connectors;
    a separator structure comprising at least one first non-conductive fibre ply, and at least one second non-conductive fibre ply, said separator structure encapsulating said at least one conductor; and a screen structure which encapsulates said separator structure, said screen structure comprising at least one second conductive fibre ply and at least one third conductive fibre ply;

wherein said device comprises an impregnated cured matrix.

* * * * *